United States Patent [19]

Yamamoto et al.

[11] Patent Number: 5,754,813
[45] Date of Patent: May 19, 1998

[54] DATA PROCESSOR

[75] Inventors: Hiroaki Yamamoto; Shinji Ozaki; Yoshito Nishimichi, all of Osaka, Japan

[73] Assignee: Matsushita Electric Industrial Co., Ltd., Osaka, Japan

[21] Appl. No.: 811,663

[22] Filed: Mar. 5, 1997

Related U.S. Application Data

[62] Division of Ser. No. 470,933, Jun. 6, 1995.

[30] Foreign Application Priority Data

Jun. 7, 1994 [JP] Japan .................................... 6-125149

[51] Int. Cl.[6] .............................. G06F 9/38; G06F 9/40
[52] U.S. Cl. ................... 395/392; 395/394; 364/DIG. 1; 364/DIG. 2
[58] Field of Search ................... 395/586, 800.23, 395/391, 591, 183.4, 394, 376, 392; 364/DIG. 1, DIG. 2

[56] References Cited

U.S. PATENT DOCUMENTS

| | | | |
|---|---|---|---|
| 4,780,807 | 10/1988 | Toyoda | 395/800 |
| 5,093,908 | 3/1992 | Beacom et al. | 395/376 |
| 5,155,817 | 10/1992 | Kishigami et al. | 395/394 |

*Primary Examiner*—Daniel H. Pan
*Attorney, Agent, or Firm*—McDermott, Will & Emery

[57] ABSTRACT

Two instruction execution units execute different types of instructions. Two instruction selection circuits are provided. Two instruction buses are coupled to an instruction standby unit having predecoders and an instruction queue. The instruction standby unit is connected by two wait instruction buses to the input sides of the instruction selection circuits. An instruction fetch control circuit detects an instruction that has not been executed by any of the instruction execution units. Such an unexecuted instruction waits in the instruction queue, thereafter being applied, together with its predecode result, to each instruction selection circuit to be selected at the next selection time. As a result of such arrangement, fast execution of different types of instructions in parallel is accomplished.

4 Claims, 13 Drawing Sheets

1

DATA PROCESSOR

This is a divisional of application Ser. No. 08/470,933, filed Jun. 6, 1995.

BACKGROUND OF THE INVENTION

The present invention relates to a data processor for use in microprocessors and the like. More particularly, it pertains to a fast, low-power data processor.

Recently, there have been demands for high-performance data processors. To meet such demands, a superscalar microprocessor has been proposed for the purpose of simultaneously executing a plurality of instructions. In a superscalar microprocessor, plural instructions are fetched by instruction cache access in each cycle, thereafter being supplied to plural instruction buses. These instructions are issued to plural instruction execution units. However, many of such a type of instruction execution unit have their own execution limitations. In other words, each execution unit is so designed that it can execute only a certain type of instruction. At the time of the instruction issue, a fetched instruction must be type-identified to be issued to a right instruction execution unit that can deal with the instruction.

The organization of a conventional data processor is now described below.

FIG. 10 depicts a conventional data processor. In FIG. 10, an instruction fetch unit of the data processor is fully described. The data processor of FIG. 10 comprises an instruction cache 230, an instruction fetch unit 200, a first instruction execution unit 250, and a second instruction execution unit 260. Whereas the first instruction execution unit 250 has an integer unit 252 capable of executing integer arithmetic instructions, the second instruction execution unit 260 has a floating-point unit 262 capable of executing floating-point instructions. The data processor of FIG. 10 further includes two instruction decoders 251, 261 for decoding instruction signals which are then transmitted to the first and second instruction execution units 250 and 260. The instruction fetch unit 200 has two predecoders 221, 222 and two instruction selection circuits 241, 242. Each of the predecoders 221, 222 determines the type of instruction, and each of the instruction selection circuits 241, 242 chooses, based on the instruction type, either the first instruction execution unit 250 or the second instruction execution unit 260, whichever is capable of executing the instruction fetched. The instruction selection circuits 241, 242 are provided in an arrangement corresponding to the first and second instruction execution units 250, 260. Extended from the instruction cache 230 are two instruction buses Bin1 and Bin2 over which instructions IR1 and IR2 are transmitted to the instruction selection circuits 241, 242. BUS Bin1 is connected with the instruction selection circuit 241 and with the instruction selection circuit 242. Likewise BUS Bin2 is connected with the instruction selection n circuit 241 and with the instruction selection circuit 242. Additionally, BUS Bin1 is connected with an input of the predecoder 221, and BUS Bin2 is connected with an input of the predecoder 222. The predecoders 221 and 222 send out output signals PD1 and PD2 respectively. SIGNALS PD1 and PD2 act as control signals of each instruction selection circuit 241, 242.

FIG. 11 is a timing diagram showing the status of each signal in the data processor of FIG. 10. When INSTRUCTIONS IR1 and IR2 are supplied from the instruction cache 230 (see timing ta), INSTRUCTION IR1 is type-identified by the predecoder 221 while on the other hand INSTRUCTION IR2 is type-identified by the predecoder 222. The predecoder 221 provides SIGNAL PD1 to each of the instruction selection circuits 241, 242, depending upon the instruction type of INSTRUCTION IR1, while the predecoder 222 provides SIGNAL PD2 to each of the instruction selection circuits 241, 242, depending upon the instruction type of INSTRUCTION IR2 (see timing tb). In response, the instruction selection circuits 241, 242 select an instruction I1 corresponding to the first instruction execution unit 250 and an instruction I2 corresponding to the second instruction execution unit 260. Then INSTRUCTION I1 is applied to the first instruction decoder 251 provided on the input side of the first instruction execution unit 250, and INSTRUCTION I2 is applied to the second instruction decoder 261 provided on the input side of the second instruction execution unit 260 (see timing tc).

Although exerting fast instruction issue control requires high-speed instruction cache access, the following organization has been conventionally employed. An instruction address generation unit, not shown, is usually provided on the input side of the instruction cache 230 of FIG. 10. This instruction address generation unit and the instruction cache 230 are organized in such way that they work in response to the same reference clock signal for smooth signal processing. Although an address signal, generated by the instruction address generation unit, is outputted at accurate timing in synchronism with the reference clock signal, some delay may occur due to the capacitance of wiring arranged midway between the generation unit and the instruction cache 230 by the time the address signal has arrived at the instruction cache 230. Accordingly, in the conventional data processor, the reference clock signal is processed assuming such delay, and the timing of precharging an address decoder, the timing of decoding an address signal, the timing of precharging bit lines of an array of memory cells, and the timing of latching read data are all controlled.

Generally, control circuits, e.g., the instruction fetch unit 200 of FIG. 10, are implemented by means of automatic layout/interconnection of cells such as buffers and latches. For example, in the case of a latch cell, it receives a data signal and an enable signal. When making the latch cell operate in synchronism with an external clock signal, the clock signal is buffered by a buffer cell so that it comes to have drive power with the load and is used as a control signal (i.e., an enable signal). FIG. 12 shows the layout of a control circuit designed using a conventional layout/interconnection technique. FIG. 13 flowcharts the conventional layout/interconnection technique of FIG. 12. As shown in FIG. 12, two control signal receiving cells (e.g., latch cells) 281, 282 and two control signal generation cells (e.g., buffer cells) 283, 284 are arranged within a single block 280. Such a circuit is arranged and wired as follows.

At step SR1, a layout/interconnection process is roughly performed. At step SR2, both C1 (i.e., the load capacitance of the control signal receiving cell 281) and C2 (i.e., the load capacitance of the control signal receiving cell 282) are extracted. At step SR3, the speed is evaluated and if founded not satisfying a design target value the layout/interconnection program then moves to step SR4. At step SR4, the drive power of each of the control signal generation cells 283, 284 is adjusted. In other words, each control signal generation cell 283, 284 is replaced with a cell with a different drive power. Thereafter, steps SR1 to SR3 are repeated again, and when step SR3 makes a judgment that the aforesaid design target value is reached the program proceeds to step SR5 at which the layout/interconnection process is completed. An external master clock (CLK) is applied to each of the control signal generation cells 283, 284 which in response apply the received CLK to each of the control signal receiving cell 281, 282.

The above-noted conventional data processor, however, presents the following problems.

In accordance with the instruction fetch unit of FIG. 10, as soon as an instruction signal from the instruction cache is predecoded it is used for instruction selection/issue control to perform an instruction selection. As a result of such an organization, predecoding an instruction as well as selecting an instruction must be controlled between when an instruction is supplied from the instruction cache and when the instruction is issued to an instruction execution unit. This is a time consuming operation requiring time T of FIG. 11 for the fetch operation to be completed, therefore checking the rate of data processing.

High-speed instruction cache access is a requirement for high-speed instruction issue control in data processors. Generally, an address generation means and a cache memory are applied the same reference clock signal, and the address generation means provides an address signal in synchronism with the reference clock signal. It is however unavoidable that some delay occurs due to the wiring capacitance by the time an address signal has arrived at the cache memory. To deal with this problem the reference clock signal is processed assuming in advance such delay, and the timing of precharging an address decoder, the timing of decoding an address signal, the timing of precharging bit lines of an array of memory cells, and the timing of latching read data must be all controlled.

However, correct estimation of such a delay is difficult. When provided in an IC, preestimated values are most likely to vary due to the variation in process accuracy, due to the variation in operating voltage, and due to the variation in operating temperature, as a result of which the delay estimation must be made expecting great margins. Such margins cannot be ignored where high-speed instruction cache access is required. For example, if an instruction cache is accessed at 100 MHz and the amount of margin is 2 ns, its value corresponds to 20 percent of one cycle. From the fact that the time required for reading a memory cell is some 4 ns, it is understood that such a value occupies a large part.

Where logical units including an instruction fetch unit are designed with the assistance of an automatic layout/interconnection technique, the clock signal drive power must be adjusted to reduce the degree of clock skew. However, in performing an automatic layout/interconnection process to a system having a conventional organization, such a process must be re-executed by the replacement of logical elements (cells) for drive power adjustment. In such a case, different cells with different drive power are used, as a result of which information about the cell layout of a circuit varies, and the clock signal drive power will change. As a result, fine adjustment of the drive power becomes difficult. Additionally, automatic layout/interconnection must be repeated until an optimum circuit is generated, therefore increasing the number of design steps. Furthermore, if a layout/interconnection process is automatically executed using buffer cells with great drive power, this reduces the clock signal transmission time and the clock skew but increases the circuit area and the power consumption.

SUMMARY OF THE INVENTION

Accordingly it is a first object of the present invention to provide a fast superscalar data processor that is realized by making use of instructions stored in an instruction queue for the purpose of exerting instruction selection/issue control.

It is a second object of the present invention to provide a fast data processor that is realized by providing a physical organization to obtain a cache memory operation timing control signal with optimum timing, taking the amount of delay between when an address signal is outputted and when it arrives at a cache memory into account.

It is a third object of the present invention to provide a fast data processor that is realized by improving the layout relationship of a control signal generation cell and a control signal receiving cell when performing a layout/interconnection process.

In order to accomplish the first object, the present invention provides an improved data processor. An instruction standby unit is provided which temporarily stores instructions from a cache memory, and these stored instruction are used to control the issue of instructions. The present invention provides a data processor comprising:

an instruction generation unit for generating different types of instructions;

a plurality of instruction execution units capable of different types of instructions;

an instruction fetch unit capable of selectively fetching an instruction from the instruction generation unit, for forwarding to each of the instruction execution units;

the instruction fetch unit including:
  (a) a plurality of instruction selection circuits which are in a one-for-one arrangement to the instruction execution units and each of which has a plurality of input terminals to receive respective instructions;
    each of the instruction selection circuits selecting an instruction of the received instructions according to a control signal for forwarding to each of the instruction execution units;
  (b) an instruction standby unit whose input side is coupled by an instruction bus to the instruction generation unit and whose output side is coupled by a wait instruction bus to an input terminal of the input terminals of each of the instruction selection circuits;
    the instruction standby unit temporarily holding an input instruction;
  (c) control means capable of:
    detecting each instruction supplied from the instruction selection circuits to the instruction execution units;
    causing the instruction standby unit to store an instruction of instructions from the instruction generation unit that has not been executed by either of the instruction execution units;
    causing the instruction selection circuits to send such an unexecuted instruction to the instruction execution units.

As a result of such arrangement, the instruction selection circuit selects either an instruction transmitted over the instruction bus or an instruction transmitted from the instruction standby unit over the wait instruction bus, and of all the instructions supplied over the instruction bus those that remain unselected and unexecuted are stored by the instruction standby unit. These unselected, unexecuted instructions, together with newly supplied instructions, are supplied at the next timing to each instruction selection circuit. This enables the instruction execution units to concurrently execute different types of instructions. The issue of instructions is performed effectively.

In order to accomplish the second object, the present invention provides a physical organization by which a clock signal and an address signal applied to a cache memory operate in synchronism with each other. The present invention provides another data processor having at least a cache memory. This data processor comprises:

means for generating an address signal;

means for generating an address synchronization clock signal in timing corresponding to the change timing of the address signal;

means for controlling the operating timing of the cache memory with the assistance of the address synchronization clock signal.

As a result of such arrangement, an address synchronization clock signal, which is in synchronism with an address signal produced by the clock generation means, is applied to a cache memory. The optimum distribution of time for cache memory internal operations becomes possible thereby eliminating dead time. The operating cycle time of the entire cache memory can be reduced to a minimum.

In order to accomplish the third object, the present invention provides a data processor organization or its layout/interconnection method. More specifically, control signal generation cells are arranged outside a logical unit, to facilitate and ensure drive power adjustment. The present invention provides still another data processor that comprises:

a plurality of control signal generation cells for generating control signals;

a plurality of control signal receiving cells for receiving the control signals from the control signal generation cells;

the control signal receiving cells being arranged in a common logical unit;

the control signal generation cells being arranged in a control signal generation unit arranged independently of the logical unit.

The present invention provides a layout/interconnection method for a data processor formed by a plurality of control signal generation cells for generating control signals and a plurality of control signal receiving cells for receiving the control signals from the control signal generation cells. This layout/interconnection method comprises:

performing a first layout/interconnection step of arranging the control signal receiving cells in a common logical unit for wiring;

performing a second layout/interconnection step of arranging the control signal generation cells in a control signal generation unit arranged independently of the logical unit for wiring.

In accordance with this arrangement, the control signal generation cells are arranged to be separated from the logic unit. This facilitates drive power adjustment of the control signal generation cell, and the supply of high-accuracy control signals contributes to speeding up the operation of data processor. The control signal generation cells are arranged to be separated from the logic unit, so that this facilitates drive power adjustment of the control signal generation cell in the layout/interconnection phase.

DETAILED DESCRIPTION OF THE INVENTION

Referring now to the attached drawing figures, a preferred embodiment of the present invention is described below.

Figure 1:
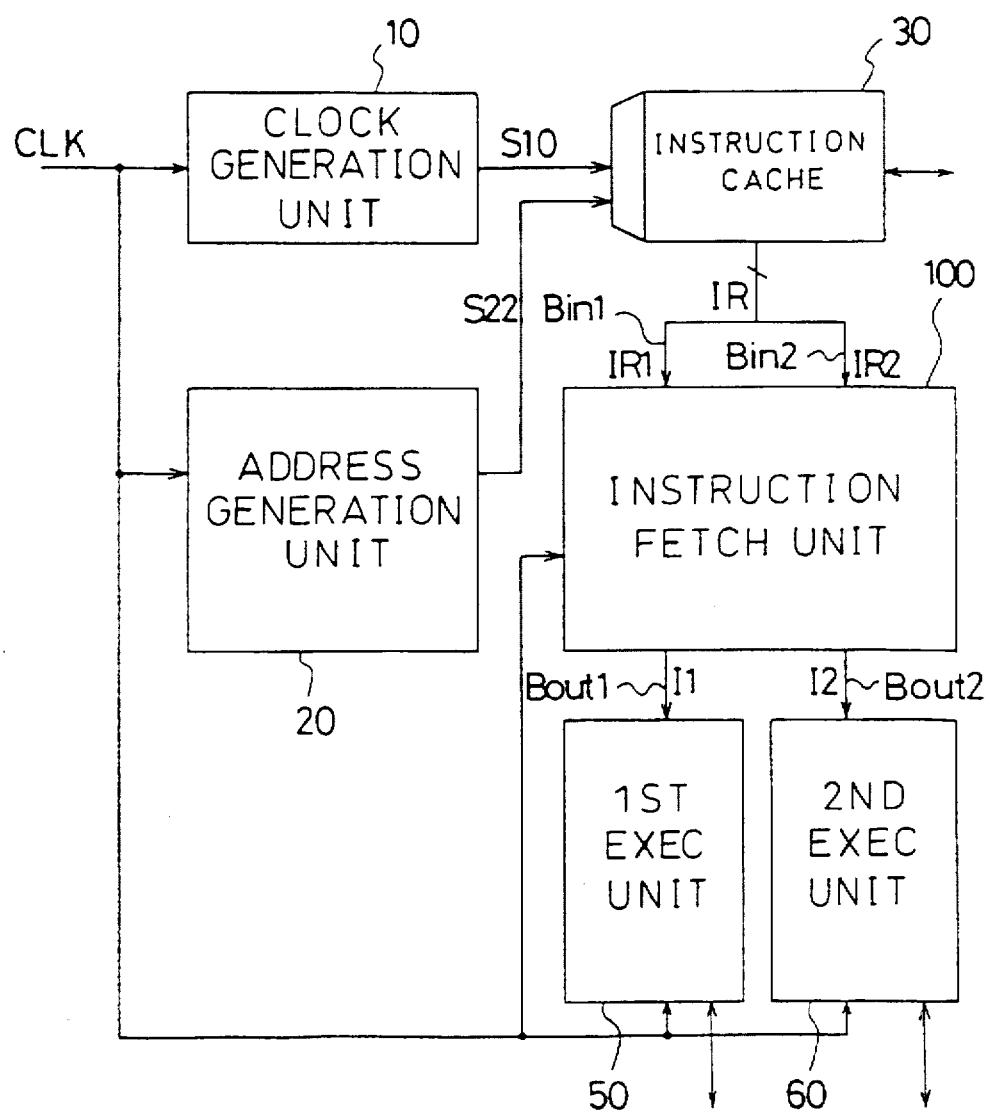
FIG. 1 is a block diagram showing the entire organization of a data processor in accordance with the present invention.

Referring now to FIG. 1, a data processor in accordance with the present invention is described. The data processor, shown in FIG. 1, has an instruction cache operation clock generation unit 10, an instruction address generation unit 20, an instruction cache 30, an instruction fetch unit 100 coupled to the instruction cache 30 via instruction buses Bin1 and Bin2, a first instruction execution unit 50 coupled to the instruction fetch unit 100 via an instruction issue bus Bout1, and a second instruction execution unit 60 coupled to the instruction fetch unit 100 via an instruction issue bus Bout2. The instruction cache 30 is coupled to an instruction bus not shown in the figure. The instruction execution units 50 and 60 are each coupled to a register file associated with a data cache not shown in the figure, with a data address generation unit, and with a data cache operation clock generation unit.

The instruction cache operation clock generation unit 10, the instruction address generation unit 20, the instruction fetch unit 100, the first instruction execution unit 50, and the second instruction execution unit 60 each operate in response to an external clock signal (CLK). On the other hand, the instruction cache 30 operates in response to an address synchronization clock signal (S10) generated by the instruction cache operation clock generation unit 10. The first and second instruction execution units 50, 60 execute instructions of different types. In other words, the instruction address generation unit 20 provides an address signal (S22) to the instruction cache 30. In response, two instructions are read per cycle from the instruction cache 30, and instructions IR1 and IR2 corresponding to SIGNAL S22 are outputted onto BUSES Bin1 and Bin2. Then, INSTRUCTIONS IR1 and IR2 are applied to the instruction fetch unit 100 via BUSES Bin1 and Bin2. INSTRUCTIONS IR1 and IR2 are sorted by the instruction fetch unit 100 for forwarding to the instruction execution units 50, 60 via BUSES Bout1 and Bout2.

Figure 2:
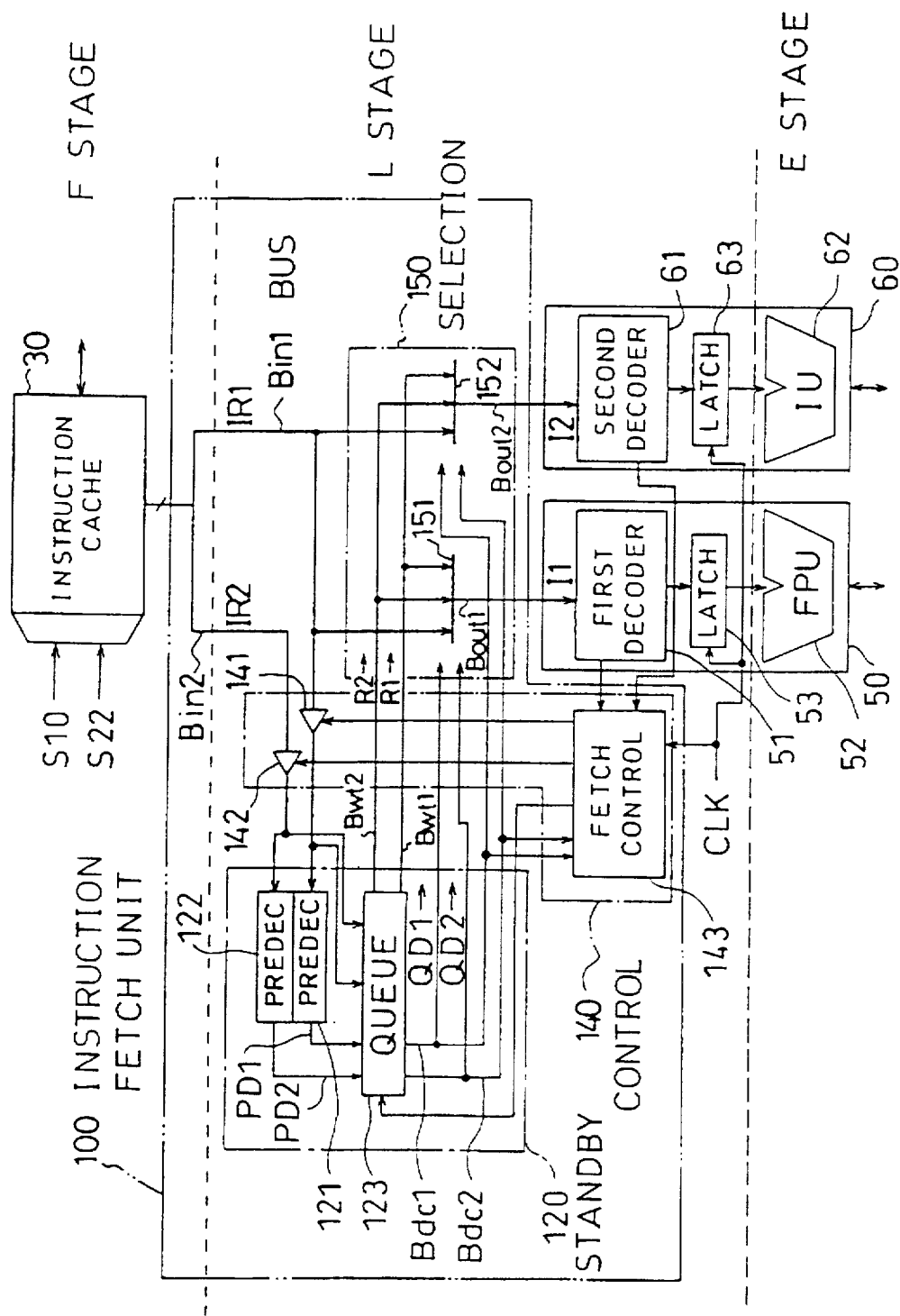
FIG. 2 is a circuit diagram illustrating in detail the organization of an instruction fetch unit of FIG. 1.

As shown in FIG. 2, the instruction fetch unit 100 has the following: a predecoder 121 for decoding INSTRUCTION IR1 from BUS Bin1; a predecoder 122 for decoding INSTRUCTION IR2 from BUS Bin2; an instruction queue 123 which temporary holds outputs of the predecoders 121, 122 as well as signals on BUSES Bin1 and Bin2 and which outputs such held signals in the same order that they are entered; a 3-state buffer 141 arranged on BUS Bin1 between the instruction cache 30 and the input side of the predecoder 121; a 3-state buffer 142 arranged on BUS Bin2 between the instruction cache 30 and the input side of the predecoder 122; an instruction fetch control circuit 143 that detects what types of instructions are inputted to the instruction execution units 50, 60, so as to control the issue of instructions; an instruction selection circuit 151 with three input terminals to receive respective instructions, two control terminals, and one output terminal, for selecting one of the received instructions for forwarding to the first instruction execution unit 50; and an instruction selection circuit 152 with three input terminals to receive respective instructions, two control terminals, and one output terminal, for selecting one of the received instructions for forwarding to the second instruction execution unit 60. Output terminals of the instruction queue 123 are coupled to a first wait instruction bus (Bwt1) and to a second wait instruction bus (Bwt2), respectively. BUS Bwt1 is coupled to one of the three input terminals of the instruction selection circuit 151 and to one of the three input terminals of the instruction selection circuit 152, while BUS Bwt2 is coupled to another of the three input terminals of the instruction selection circuit 151 and to another of the three input terminals of the instruction selection circuit 152. Wait instruction decode signal lines Bdc1 and Bdc2 for transmitting wait instruction decode signals are routed as follows. LINE Bdc1, on the one hand, extends from the output side of the predecoder 121, via the instruction queue 123, to one of the two control terminals of the instruction selection circuit 151 and to one of the two control terminals of the instruction selection circuit 152. LINE Bdc2, on the other hand, extends from the output side of the predecoder 122, via the instruction queue 123, to the other control terminal of the instruction selection circuit 151 and to the other control terminal of the instruction selection circuit 152. In other words, wait instruction decode signals are temporarily held by the instruction queue 123 and at the next timing they are delivered to each instruction selection circuit 151, 152. In the organization of the instruction fetch unit 100, an instruction standby unit 120 is made up of the predecoders 121, 122 and the instruction queue 123, and an instruction selection unit 150 is made up of the instruction selection circuits 151, 152, and a control unit 140 is made up of the 3-state buffers 141, 142 and the instruction fetch control circuit 143.

The first instruction execution unit 50 has a first instruction decoder 51, a latch 53, and a floating-point unit 52 capable of executing floating-point instructions, whereas the second instruction execution unit 60 has a second instruction decoder 61, a latch 63, and an integer unit 62 capable of executing integer arithmetic instructions. BUS Bout1 connects together an output terminal of the instruction selection circuit 151 and the first instruction decoder 51. BUS Bout2 connects together the output terminal of the instruction selection circuit 152 and the second instruction decoder 61. Each latch 53, 63 intervenes between PIPELINE L (LOAD) STAGE and PIPELINE E (EXECUTION) STAGE.

Each element of the data processor with the above-described organization is described. From the instruction cache 30 INSTRUCTION IR1 and INSTRUCTION IR2 are read onto BUS Bin1 and onto BUS Bin2 respectively in a single cycle. INSTRUCTION IR1 on BUS Bin1, on the one hand, is supplied to the predecoder 121, to the instruction queue 123, and to the first instruction selection circuit 151, and to the second instruction selection circuit 152. INSTRUCTION IR2 on BUS Bin2, on the other hand, is supplied to the predecoder 122 and to the instruction queue 123. The predecoder 121 (122) identifies the type of INSTRUCTION IR1 (INSTRUCTION IR2). In other words, the predecoder 121 (122) determines whether INSTRUCTION IR1 (INSTRUCTION IR2) is an integer arithmetic instruction or a floating-point arithmetic instruction, thereafter applying SIGNAL PD1 (PD2) to the instruction queue 123. The instruction queue 123 has an FIFO (first-in first-out) memory circuit with plural entries, each entry being capable of storing an instruction and a corresponding wait instruction decode signal, and these entries are sequentially read in the same order that they are written. The instruction queue 123 is constructed such that it is able to write to two consecutive entries INSTRUCTION IR1 and INSTRUCTION IR2 and SIGNALS PD1 and PD2 in one cycle time, and the instruction fetch control circuit 143 exerts control so that only unexecuted instructions and corresponding wait instruction decode signals are written. Additionally, instructions, written first into two consecutive entries, are applied as wait instructions R1 and R2 to the input terminals of the instruction selection circuit 151 and 152 via BUSES Bwt1 and Bwt2, and SIGNALS QD1 and QD2 are forwarded, via LINES Bdc1 and Bdc2, to the control terminals of the first and second instruction selection circuits 151 and 152, and to the instruction fetch control circuit 143. The first and second instruction selection circuits 151 and 152 each select one of three signals from BUSES Bin1, from BUS Bwt1, and from BUS Bwt2, according to SIGNALS QD1 and QD2. A signal selected by the first instruction selection circuit 151 is outputted onto BUS Bout1, while a signal selected by the second instruction selection circuit 152 is outputted onto BUS Bout2.

The first instruction selection circuit 151 selects INSTRUCTION R1 if SIGNAL QD1 indicates that INSTRUCTION R1 is a floating-point arithmetic instruction. The instruction selection circuit 151 selects INSTRUCTION R2 if SIGNAL QD1 indicates that INSTRUCTION R1 is an integer arithmetic instruction and SIGNAL QD2 indicates that INSTRUCTION R2 is a floating-point arithmetic instruction. Otherwise, the instruction selection circuit 151 selects INSTRUCTION IR1 received from BUS Bin1. The instruction thus selected by the instruction selection circuit 151 is delivered via BUS Bout1 to the instruction execution unit 50. The second instruction selection circuit 152 selects INSTRUCTION R1 if SIGNAL QD1 indicates that INSTRUCTION R1 is an integer arithmetic instruction. The instruction selection circuit 152 selects INSTRUCTION R2 if SIGNAL QD1 indicates that INSTRUCTION R1 is a floating-point arithmetic instruction and SIGNAL QD2 indicates that INSTRUCTION R2 is an integer arithmetic instruction. Otherwise, the instruction selection circuit 152 selects INSTRUCTION IR1 received from BUS Bin1. The instruction thus selected by the instruction selection circuit 152 is delivered via BUS Bout2 to the instruction execution unit 60.

Figure 3:
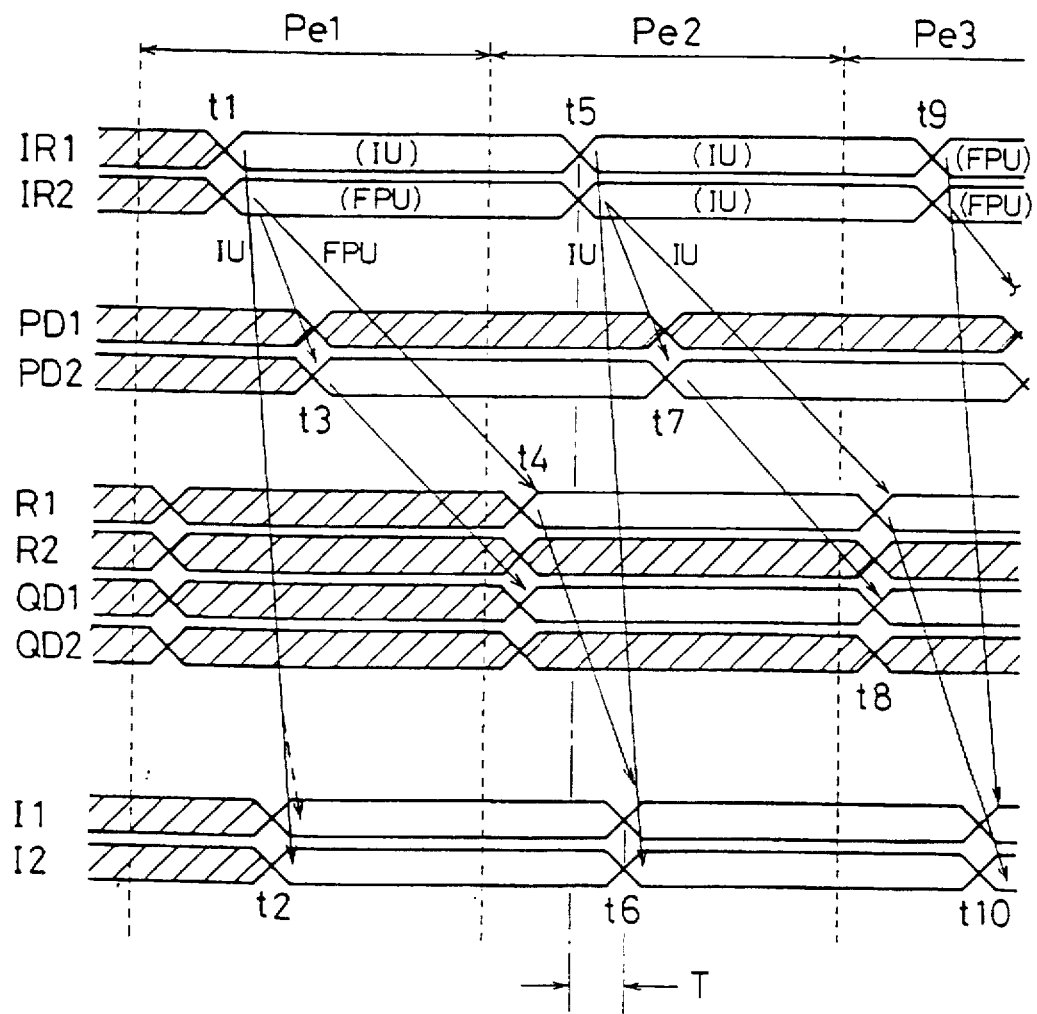
FIG. 3 is a timing diagram useful in understanding the operation of the instruction fetch unit of FIG. 2.

The operation of the data processor is illustrated with reference to FIG. 3. Here suppose INSTRUCTION IR1 is applied onto BUS Bin1, and INSTRUCTION IR2 onto BUS Bin2, with all the entries of the instruction queue 123 being unwritten at all. In this example, INSTRUCTION IR1 is an integer arithmetic instruction and INSTRUCTION IR2 is a floating-point arithmetic instruction. In clock cycle Pe1 (i.e., the first clock cycle), INSTRUCTIONS IR1 and IR2 are supplied to BUSES Bin1 and Bin2 respectively at timing t1, and the first and second instruction selection circuits 151 and 152 each select INSTRUCTION IR1 (the integer arithmetic instruction) on BUS Bin1 because no instructions are supplied to BUSES Bwt1 and Bwt2. Then INSTRUCTION IR1 selected is supplied via BUSES Bout1 and Bout2 to the first instruction execution unit 50 and to the second instruction execution unit 60. In this case, INSTRUCTION IR1 is executed by the second instruction execution unit 60; however INSTRUCTION IR1 is ignored by the first instruction execution unit 50 because it is unable to execute INSTRUCTION IR1. Therefore, in cycle Pe1 only INSTRUCTION I2, i.e., INSTRUCTION IR1 (the integer arithmetic instruction) of the second instruction selection circuit 152 is executed (see timing t2 of FIG. 3). The instruction fetch control circuit 143 controls, based on the result of decode operations by the instruction decoders 51 and 61, the 3-state buffers 141 and 142 and the instruction queue 123. As a result of this, INSTRUCTION IR2 (the floating-point arithmetic instruction) that has been left unexecuted is written into the instruction queue 123. The predecoder 122 generates SIGNAL PD2 indicating that that INSTRUCTION IR2 is a floating-point arithmetic instruction, and that SIGNAL PD2, too, is written in the instruction queue 123.

Next, in clock cycle Pe2, INSTRUCTION IR2 (the floating-point arithmetic instruction) that is standing by at the instruction queue 123 and its SIGNAL PD2 are provided as INSTRUCTION R1 and as SIGNAL QD1 respectively (timing t4). Also, in cycle Pe2, a new INSTRUCTION IR1 is supplied to BUS Bin1 and a new INSTRUCTION IR2 is supplied to BUS Bin2 (timing t5). Suppose these two new instructions are integer arithmetic instructions. The first instruction selection circuit 151 selects INSTRUCTION R1 (the floating-point arithmetic instruction) on BUS Bwt1. This INSTRUCTION R1 is provided to the first instruction execution unit 50 as INSTRUCTION I1. Meanwhile, the second instruction selection circuit 152 selects INSTRUCTION IR1 (the integer arithmetic instruction) on BUS Bin1. This INSTRUCTION IR1 is provided to the second instruction execution unit 60 as INSTRUCTION I2. These INSTRUCTIONS I1 and I2 are executed by the first instruction execution unit 50 and by the second instruction execution unit 60, respectively. In cycle Pe2, two instructions (I1, I2) are executed concurrently (timing t6). Since neither INSTRUCTION IR1 of BUS Bin1 nor INSTRUCTION IR2 of BUS Bin2 is predecoded within time T between timing t5 and timing t6, this results in reducing time T. On the other hand, INSTRUCTION IR2 (the integer arithmetic instruction), which has not been inputted to either of the execution units 50 and 60, is now written in the instruction queue 123 by the instruction fetch control circuit 143. The predecoder 122 generates SIGNAL PD2 indicating that that INSTRUCTION IR2 is an integer arithmetic instruction, and this SIGNAL PD2, too, is written into the instruction queue 123 (timing t7).

In clock cycle Pe3, the instruction queue 123 provides INSTRUCTION IR2 (the integer arithmetic instruction) that is standing by and its SIGNAL PD2 as INSTRUCTION R1 and as SIGNAL QD1 respectively (timing t8). Also, in this cycle Pe3, NEW INSTRUCTIONS IR1 and IR2 are supplied onto BUSES Bin1 and Bin2 respectively (for example, both are floating-point arithmetic instructions) (timing t9). The instruction selection circuit 151 selects INSTRUCTION IR1 (the floating-point arithmetic instruction) received from BUS Bin1, while on the other hand the instruction selection circuit 152 selects INSTRUCTION IR1 (the integer arithmetic instruction) received from BUS Bwt1 (timing t10). Meanwhile, INSTRUCTION IR2 (the floating-point arithmetic instruction) and its SIGNAL PA2 that have not been inputted to either of the instruction execution units 50 and 60 are written to the instruction queue 123 by the instruction fetch control circuit 143.

As is described above, in accordance with the present data processor, two instructions can be executed concurrently by instruction combination in a clock cycle in which the instruction queue 123 holds an instruction. In the present embodiment, the number of instructions to be executed is two at most, which means that the number of instructions to be supplied does not exceed two. Therefore, as long as the supply of instruction is carried out continuously, the instruction queue 123 always stores one or more instructions. As a result, it is possible to always execute two instructions concurrently as the instruction combination permits. In such a case, a conventional technique uses decoded contents of BUSES Bin1 and Bin2 in order that instruction selection/issue is controlled by an instruction execution unit. In the present invention, however, SIGNALS QD1 and QD2 are used instead. The read time of the instruction queue 123 is short in comparison with the instruction cache 30, so that instructions on BUSES Bwt1 and Bwt2 are fixed fast in comparison with BUSES Bin1 and Bin2. Additionally, in a conventional technique, a series of operations (the operations of reading, predecoding, issue instruction selecting from BUSES Bin1 and Bin2) must be performed within one cycle. In the present embodiment, however, only the operations of reading and issue instruction selecting from the instruction queue 123 are required to be done within one cycle. As a result of such arrangement of the present embodiment, the operation of instruction selection/issue can be performed at a higher speed in comparison with a case where the instruction type is first identified and then the operation of instruction issue/control is performed. A high-speed data processor is realized by the present invention.

In the present embodiment, the instruction cache 30 is constructed in such a way as to provide two instructions to two instruction buses in one clock. However, the instruction cache 30 may provide an instruction to one instruction bus or instructions to three or more buses, to realize the same operation as in the above case.

In the instruction fetch unit 100 of the present embodiment, the instruction queue 123 stores instructions and signals for forwarding to two wait instruction buses and to two wait instruction decode signal lines. However, one, or three or more wait instruction buses (wait instruction decode signal lines) may be provided so that each bus (line) receives an instruction and a signal stored in the instruction queue.

Figure 4:
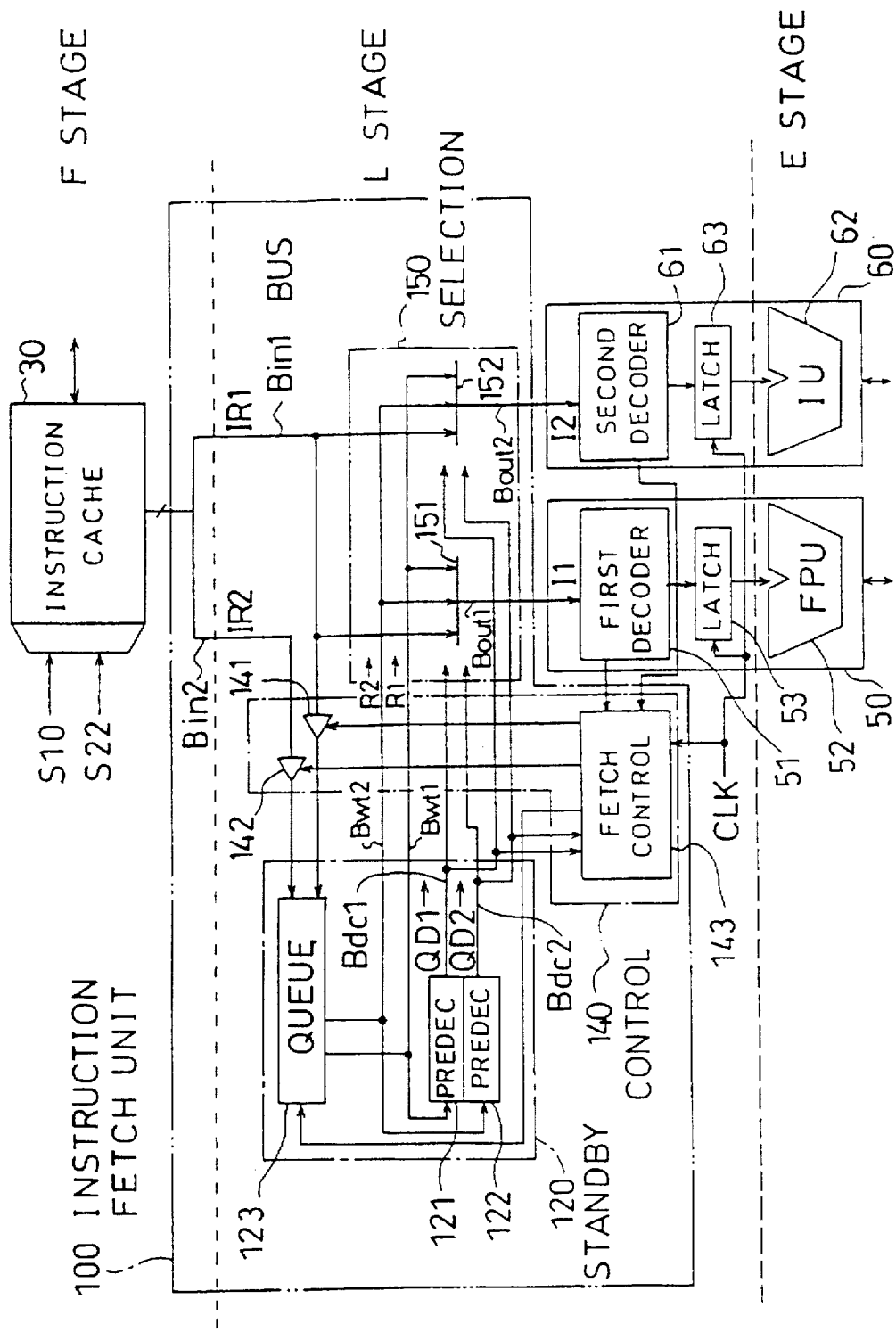
FIG. 4 is a circuit diagram illustrating the organization of an alternation of the instruction fetch unit of FIG. 2.

FIG. 4 illustrates an alternation of the FIG. 2 instruction fetch unit. In this alternation, the 3-state buffers 141, 142, the instruction queue 123, and the predecoders 121, 122 are arranged in that order from BUSES Bin1 and Bin2. LINES Bdc1 and Bdc2 are coupled to the output terminals of the predecoders 121, 122, and BUSES Bwt1 and Bwt2 are coupled to the output terminals of the instruction queue 123. The same effects that are obtained by the FIG. 2 organization can be obtained by this alternation.

Figure 5:
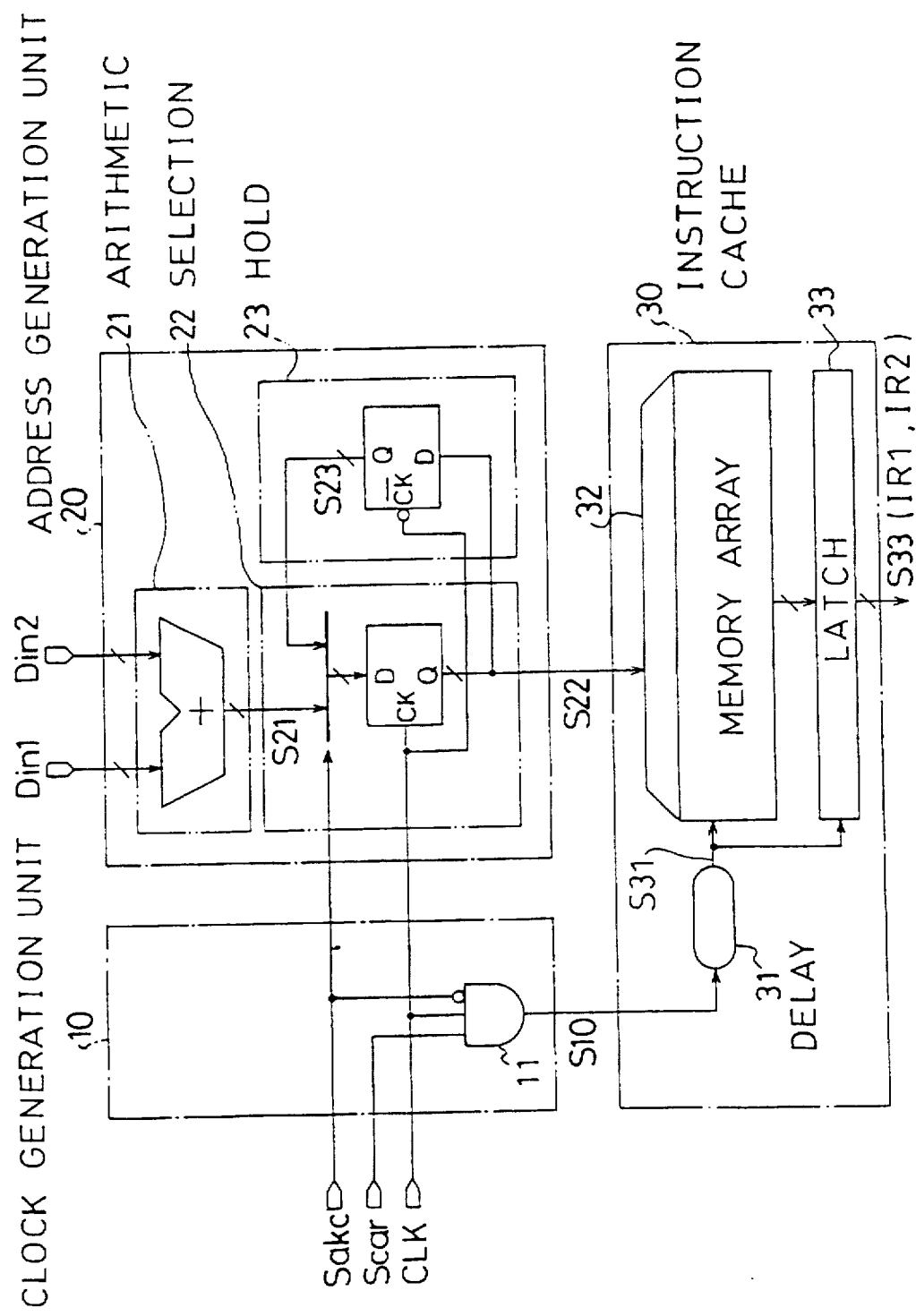
FIG. 5 is a circuit diagram illustrating in detail an instruction cache operation clock generation unit, an instruction address generation unit, and an instruction cache of FIG. 1.

FIG. 5 is a circuit diagram showing in detail the organizations of the instruction cache operation clock generation unit 10, the instruction address generation unit 20, and the instruction cache 30. As shown in FIG. 5, the instruction cache operation clock generation unit 10 comprises an AND circuit I1 by which a reference clock signal (CLK), a signal obtained as a result of inverting an address hold control signal (Sakc), and a cache operation request signal (Scar) are ANDed. The instruction address generation unit 20 has an address arithmetic circuit 21, an address selection circuit 22 formed by a selector and flip-flops, and an address hold circuit 23 formed by flip-flops. The instruction cache 30 has a signal delay circuit 31, a memory array 32, and a latch 33. The signal delay circuit 31 is made up of, for example, a plurality of dummy gate capacitors. The latch 33 intervenes between PIPELINE F (FETCH) STAGE and PIPELINE L (LOAD) STAGE.

The address arithmetic circuit 21 inputs input data Din1 and input data Din2 (for example, a program counter value and a register value) and provides an address arithmetic result signal (S21). SIGNAL S21 acts as a first data input of the address selection circuit 22. The address hold circuit 23 receives an address signal (S22) from the address selection circuit 22 and provides a hold address signal (S23). SIGNAL S23 acts as a second data input of the address selection circuit 22. SIGNAL Sakc is also applied to the address selection circuit 22. SIGNAL CLK is also applied to the address selection circuit 22 and to the address hold circuit 23.

In the instruction cache 30, SIGNAL S22 is applied from the instruction address generation unit 20 to the memory array 32, and an address synchronization clock signal (S10) is applied form the instruction cache operation clock generation unit 10 to the signal delay circuit 31. In response, the signal delay circuit 31 outputs a delay clock signal (S31) that delays SIGNAL S31 for a given length of time. The memory array 32 operates according to SIGNAL S31 and outputs an instruction signal according to SIGNAL S22. This instruction signal is held by the latch 33 and then is outputted as a final instruction output signal (S33) indicative of INSTRUCTIONS IR1 and IR2. The latch 33 also operates in response to SIGNAL S31.

Figure 6:
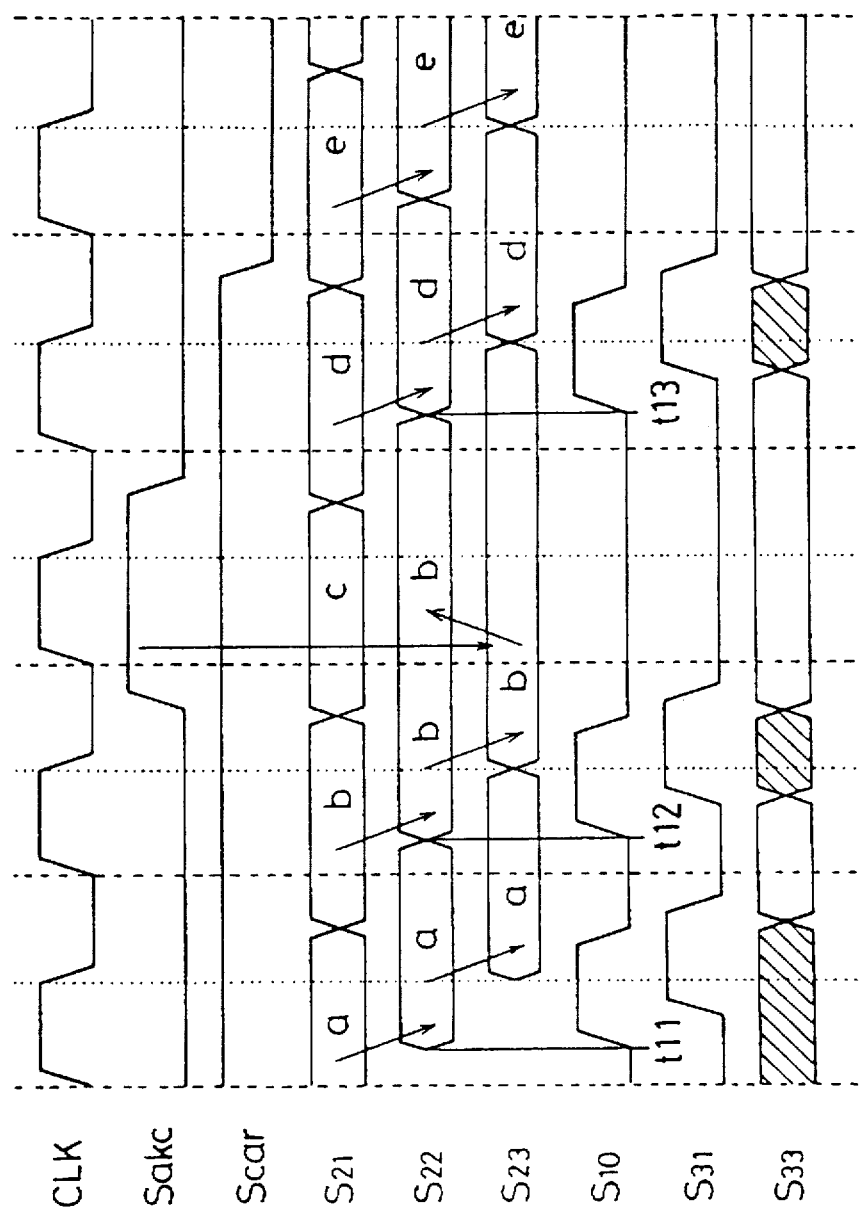
FIG. 6 is a timing diagram useful in understanding the operation of the circuit of FIG. 5.

The data processor is explained by making reference to FIG. 6. FIG. 6 shows the states of SIGNALS CLK, Sakc, Scar, S21, S22, S23, S10, S31, and S33.

The address arithmetic circuit 21 completes an address arithmetic operation while SIGNAL CLK stays low. Then the address arithmetic circuit 21 outputs SIGNAL S21 ("a" to "e" of the figure) that is address information. This SIGNAL S21 is applied to the address selection circuit 22. In the address selection circuit 22, SIGNAL S21 from the address arithmetic circuit 21 is selected by the selector if SIGNAL Sakc is low, while on the other hand SIGNAL S23 from the address hold circuit 23 is selected by the selector if SIGNAL Sakc is high, and either SIGNAL S21 or SIGNAL S23 (whichever is selected) is held by the flip-flop and is outputted as SIGNAL S22. The address hold circuit 23 puts in SIGNAL S22 that was provided ½ cycle earlier from the address selection circuit 22, for holding for one cycle. This SIGNAL S22 is then outputted as SIGNAL S23 to the address selection circuit 22. With the assistance of the AND circuit 11, the instruction cache operation clock generation unit 10 generates SIGNAL S10 if SIGNAL Scar is high and if SIGNAL Sakc is low. In other words, only in a case where there is an operation request to the instruction cache 30 and SIGNAL S22 has a value different from a value one clock earlier, SIGNAL CLK is used as SIGNAL S10.

Here, SIGNAL S22 and SIGNAL S10 are adjusted by the instruction address generation unit 20 and the instruction cache operation clock generation unit 10 in order that they are delayed by the same time from SIGNAL CLK (see timings t11 to t13). In this case, SIGNAL S22 and SIGNAL S10 are applied to the instruction cache 30 via the same signal path, as a result of which both SIGNAL S22 and SIGNAL S10 are equal in wiring load capacitance with each other. Adjustment of SIGNAL S22 and SIGNAL S10 in timing can be performed easily.

In addition to having SIGNAL S22 and SIGNAL S10 pass through the same wiring path, if wiring layers are used in the same way, then these signals become equal with each other in wiring load capacitance. As a result, adjustment of SIGNAL S22 and SIGNAL S10 in timing can be performed with ease.

SIGNAL S10 is delayed by the signal delay circuit 31 for a given length of time, thereafter being outputted as SIGNAL S31. This SIGNAL S31 is applied as an operation control signal to the memory array 32 and to the latch 33. Upon receipt of SIGNAL S22 and SIGNAL S10, the instruction cache 30 commences operating. As is described above, the output timing of SIGNAL S22 and the output timing of SIGNAL S10 are the same. Therefore, address decoding can be performed with a minimum length of time if SIGNAL S10 is delayed by the signal delay circuit 31 by a proportional amount to the set-up time of an address decoder for decoding SIGNAL S22 and is applied as SIGNAL 31 to the memory array 32. Further, if the timing of the rising edge of SIGNAL S10 and the length of SIGNAL S10 staying low are adjusted so as to control both the precharge timing of bit lines of an address decoder of the memory array 32 and a memory unit and the latch timing of read data in the latch 33, then the output timing of SIGNAL S33 can easily be controlled.

The organization of FIG. 5 including the instruction cache operation clock generation unit 10, the instruction address generation unit 20, and the instruction cache 30 may be used for a data cache operation clock generation unit, data address generation unit, and data cache.

In the present embodiment, the address generation means for generating an address signal, the clock generation means for generating an address synchronization clock signal whose timing corresponds to the variation timing of the address signal generated by the address generation means, and the cache memory are provided. Such an address synchronization clock signal is used to control the operation timing of the cache memory, which enables the effective design of timing to be performed at the time of cache memory access. As a result of such arrangement, the operating cycle time of the whole cache memory can be reduced to a minimum.

Figure 7:
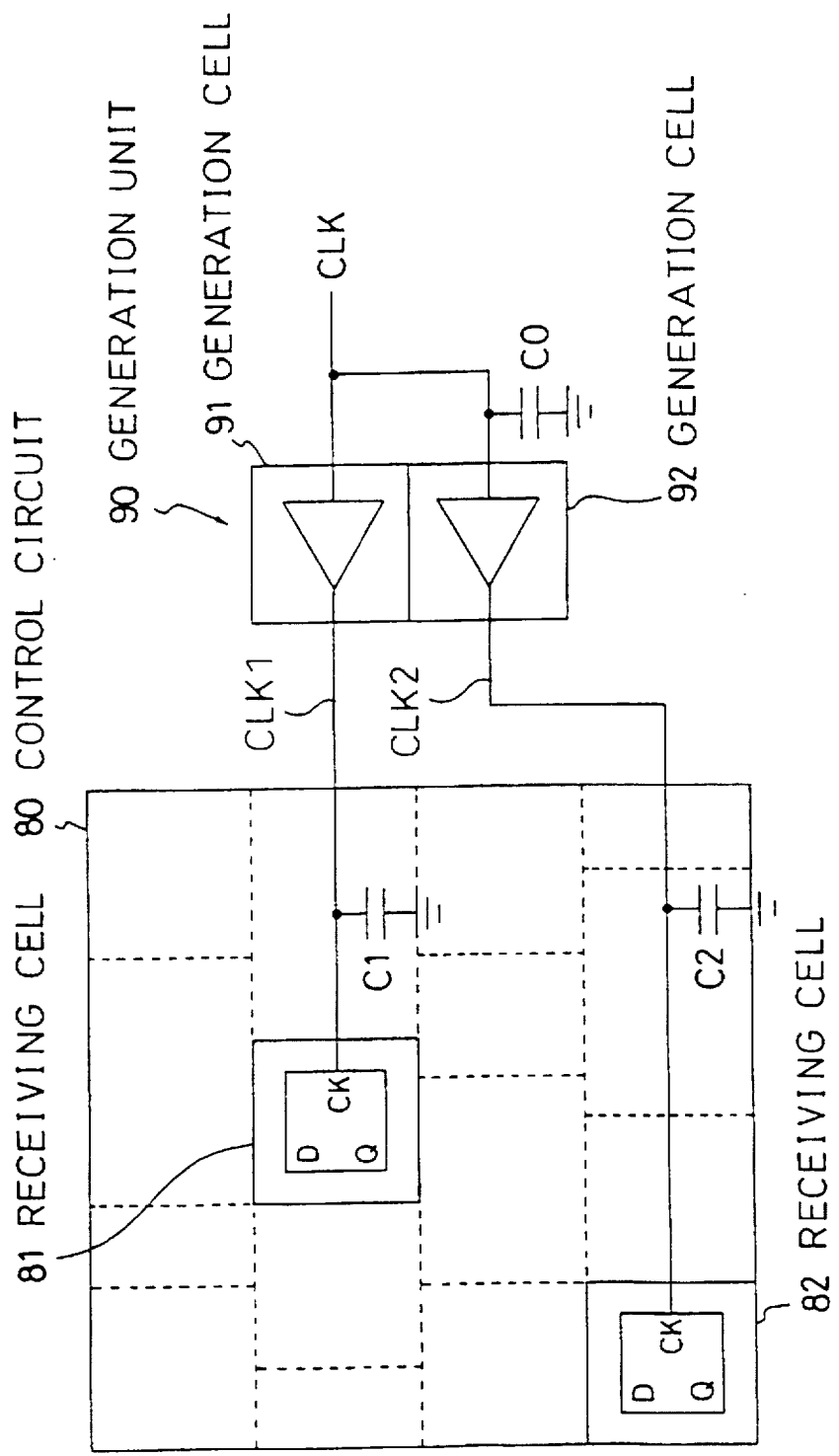
FIG. 7 is a layout diagram showing part of the organization of a data processor of the present invention.

FIG. 7 is a diagram illustrating how a data processor is arranged and wired. As shown in FIG. 7, a control signal generation unit 90, which is provided independent of the control circuit 80, comprises control signal generation cells 91, 92. On the other hand, the control circuit 80 comprises control signal receiving cells 81, 82 for receiving control signals from the control signal generation cells 91, 92. The control signal generation cells 91, 92 are formed by, for example, buffer cells and receive and buffer SIGNAL CLK to provide control signals CLK1 and CLK2. Layout Information about the control signal generation cells 91, 92 is parametrized by the channel width/length of a cell-formation transistor, and the cell drive power can be changed by changing the parameter, without changing the cell external form. The control signal receiving cells 81, 82 are formed by, for example, latch cells and receive control signals CLK1 and CLK2 from the control signal generation cells 91, 92.

Figure 8:
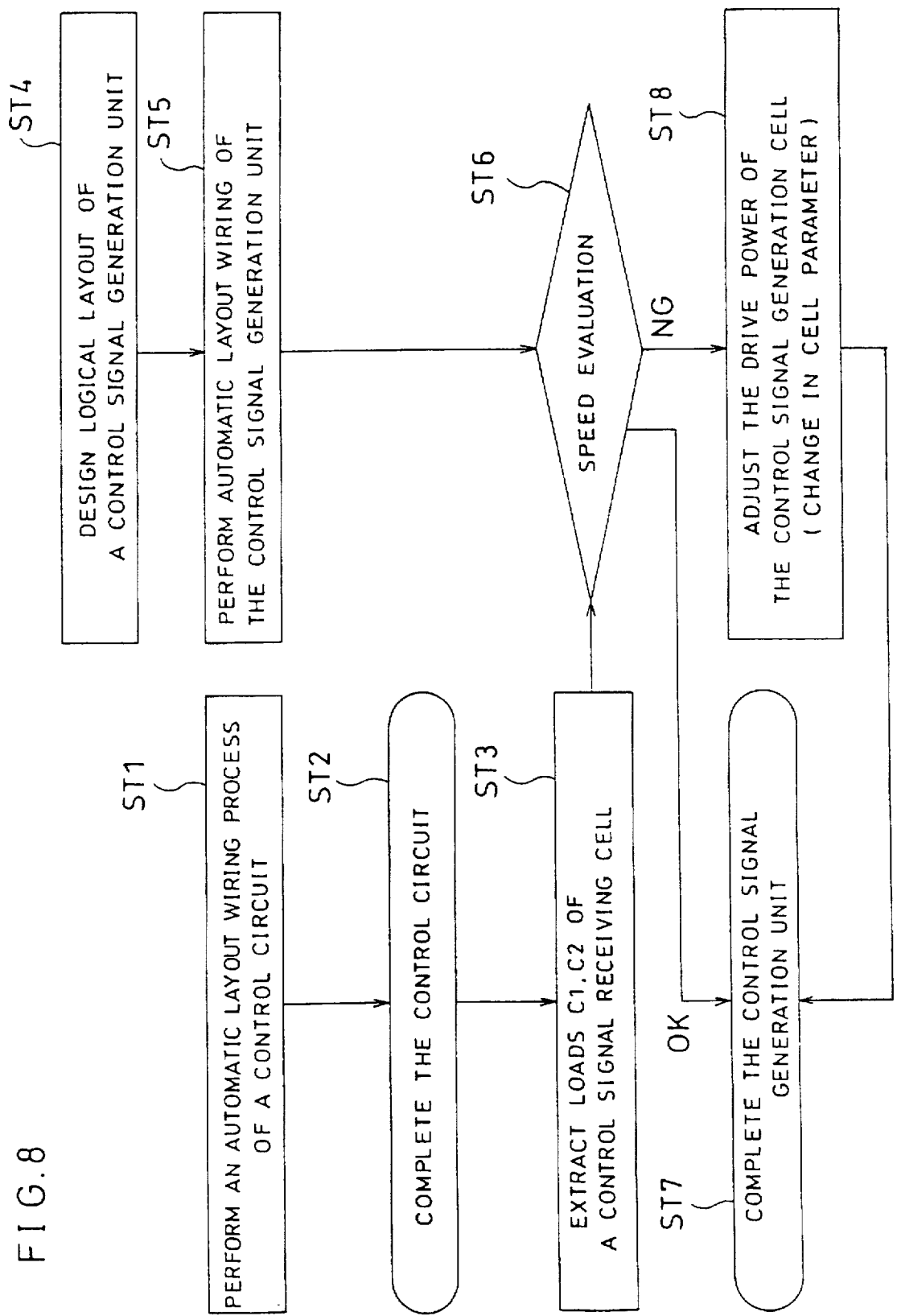
FIG. 8 shows in flow form a layout/interconnection process of the FIG. 7 data processor.

A way of arranging and wiring the control circuit 80 and the control signal generation unit 90 is explained by making reference to FIG. 8. At step ST1, an automatic layout/interconnection process of the control circuit 80 including the control signal receiving cells 81, 82 is performed. At step ST2, the control circuit 80 including the control signal receiving cells 81, 82 is completed. At step ST3, C1 (the load capacitance of the cell 81) and C2 (the load capacitance of the cell 82) are extracted. At step ST4, a logical layout of the control signal generation unit 90 including the control signal generation cells 91, 92 is designed, and at step ST5 an automatic layout/interconnection process of the control signal generation unit 90 is carried out. At step ST6, based on C1 and C2 as well as on the drive power of the cells 91, 92, the evaluation of speed is executed. If the result of the speed evaluation is satisfactory, the automatic layout/ interconnection program moves to step ST7. At step ST7, a layout/interconnection process of the control signal generation unit 90 including the cells 91, 92 is completed. On the other hand, if the result of the speed evaluation is unsatisfactory, then the cells 91, 92 are adjusted in drive power and the automatic layout/interconnection program moves to step ST7.

In accordance with the FIG. 7 organization, the control circuit 80 containing therein the control signal receiving cells 81, 82 is provided independent of the control signal generation unit 90 containing therein the control signal generation cells 91, 92. As a result of this arrangement, without depending upon the drive power of the cells 91, 92, an automatic wiring process of the control circuit 80 can be carried out. In this case, the external form of the entire data processor can be fixed earlier in comparison with a case where the control circuit 80 and the control signal generation unit 90 are designed in an interrelated manner. Additionally, the drive power of the cells 91, 92 is determined using the load capacitance of control signal based on the actual layout/interconnection information. As a result, high-accuracy timing adjustment can be realized. Further, at the time of the drive power adjustment, the external forms of the control circuit 80 and the control signal generation unit 90 have already been determined, so that what is required is to adjust only the power drive of the cells 91, 92. Therefore, re-wiring is not required and fine timing adjustment can be performed easily.

Figure 9:
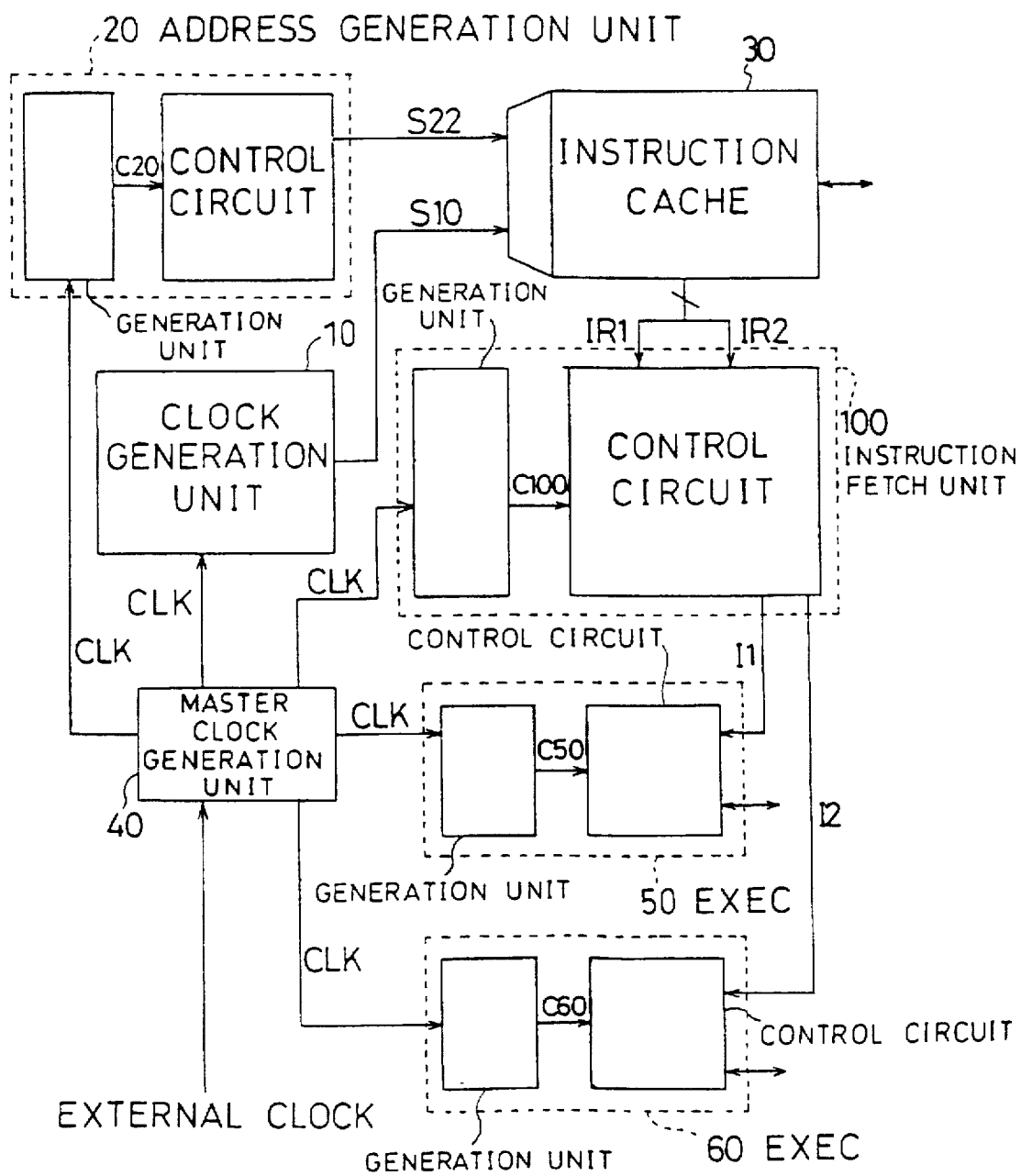
FIG. 9 is a block diagram showing the entire organization of one of applications of the FIG. 7 data processor.
Figure 10:
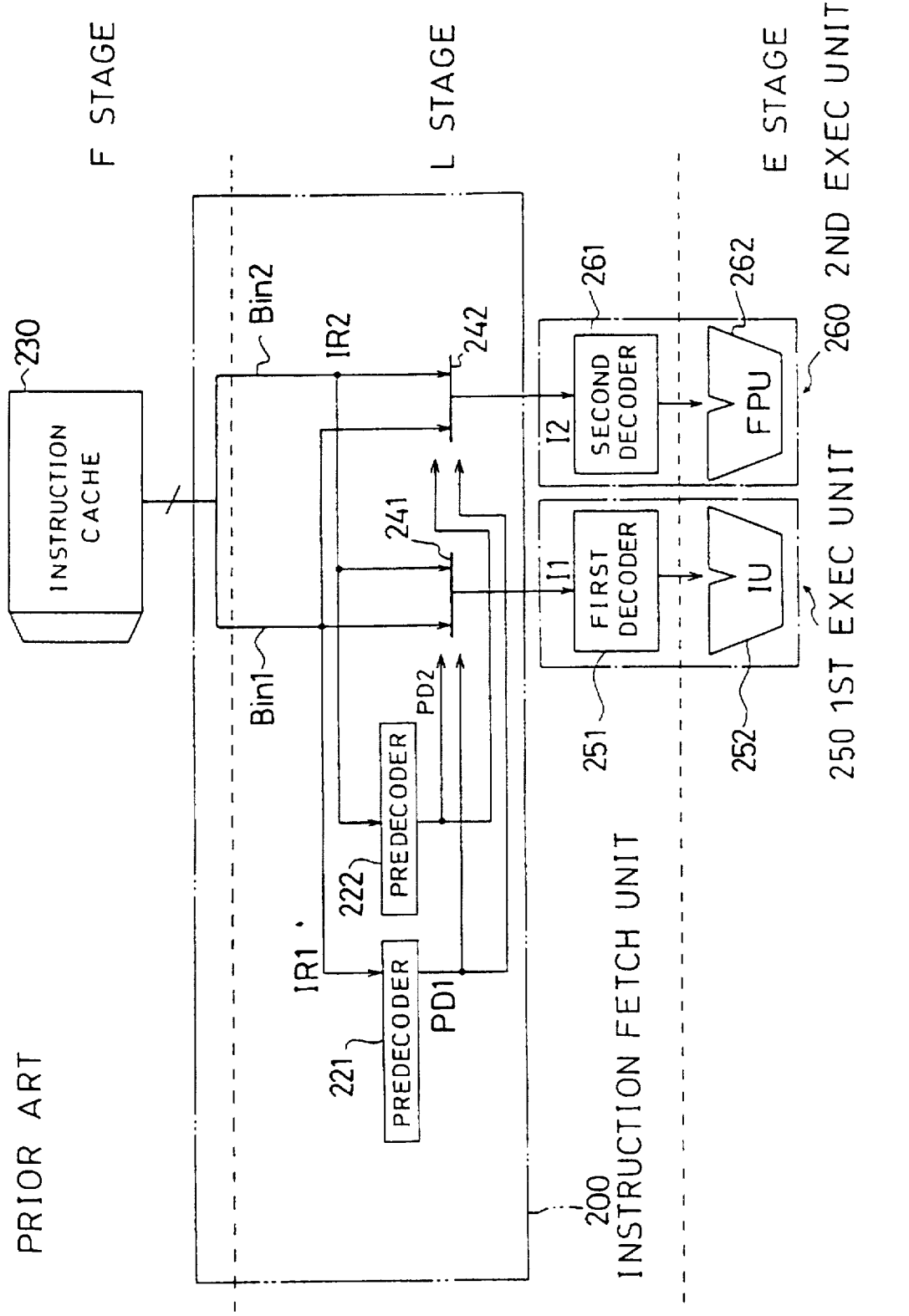
FIG. 10 is a circuit diagram illustrating the organization of a data processor in accordance with a prior art technique.
Figure 11:
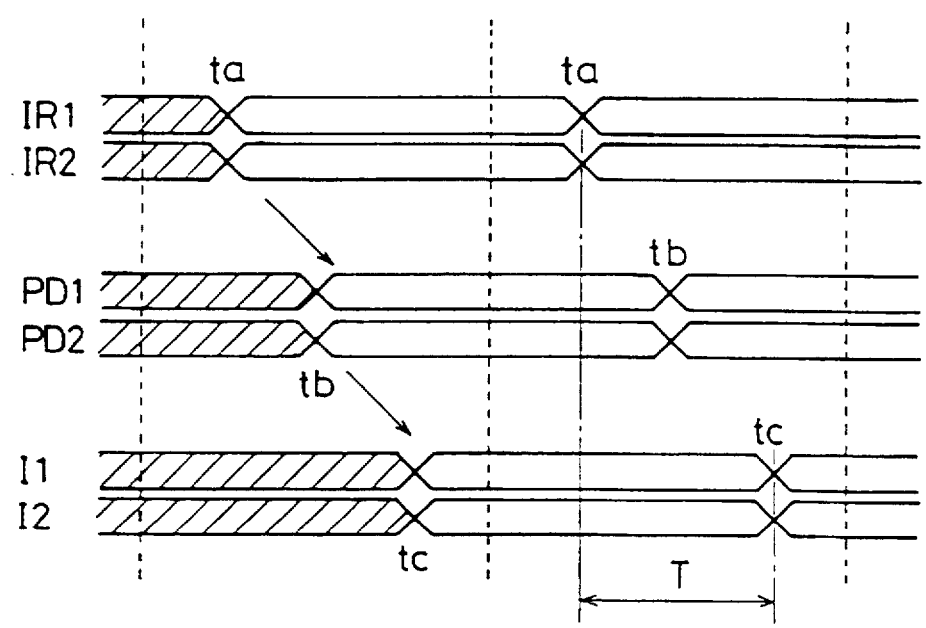
FIG. 11 is a timing diagram useful in understanding the operation of an instruction fetch unit of the FIG. 10 data processor.
Figure 12:
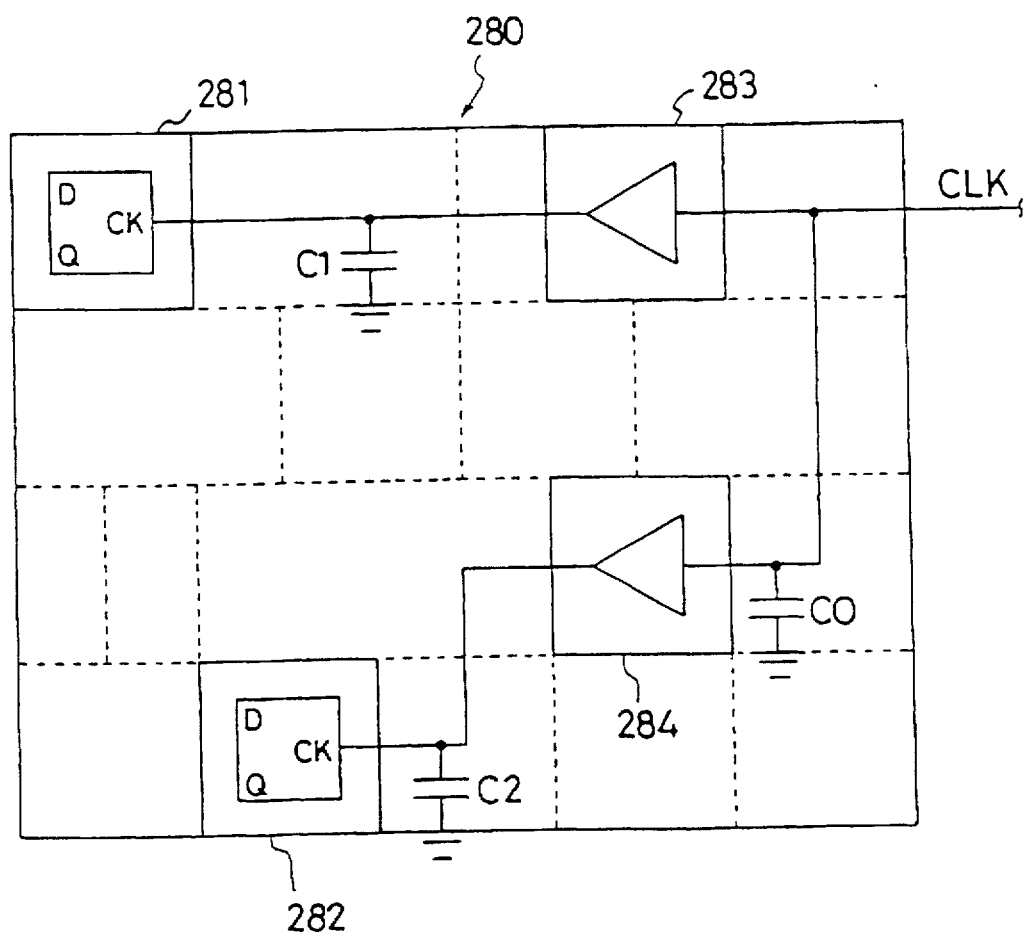
FIG. 12 is a layout diagram showing part of the organization of a conventional data processor.
Figure 13:
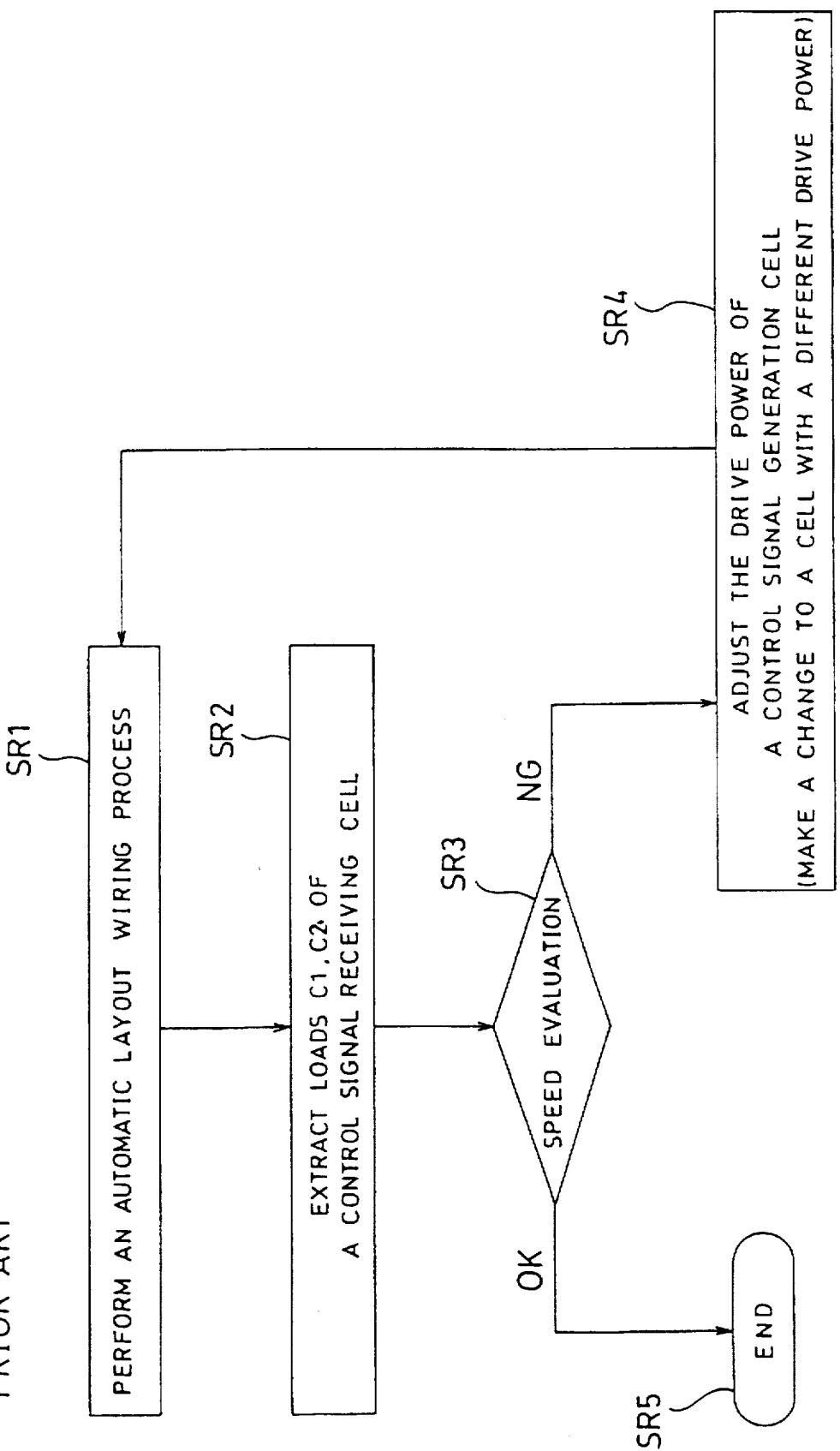
FIG. 13 shows in flow form a layout/interconnection process of the FIG. 12 data processor.

FIG. 9 shows one of applications of FIG. 7 organization. This data processor is basically identical in configuration with FIG. 1; however, the instruction address generation unit 20, the instruction fetch unit 100, the first instruction execution unit 50, and the second instruction execution unit 60 each comprise a control circuit and a control signal generation unit for supplying a clock signal to the control circuit. The control signal generation units of the units 20, 100, 50, and 60 receive reference clock signals to generate local clock signals C20, C100, C50, and C60 for controlling the control circuits.

As a result of such arrangement, the drive power of the control signal generation cells can be adjusted easily according to the load capacitance of the control signal receiving cells. Since fine adjustment of the drive power of the control signal receiving cells can be performed, this enables timing adjustment between blocks to be performed correctly and easily. For example, a correspondence in timing between SIGNAL S22 and SIGNAL S10 which are applied to the instruction cache 30 can be established and a fast data processor can be realized.

The invention claimed is:

1. A data processor comprising:
   an instruction generation unit for generating different types of instructions;
   a plurality of instruction execution units capable of executing different types of instructions;
   an instruction fetch unit capable of selectively fetching an instruction from said instruction generation unit, for forwarding to each said instruction execution unit;
   said instruction fetch unit including:
   (a) a plurality of instruction selection circuits which are in a one-for-one arrangement to said instruction execution units and each of which has a plurality of input terminals to receive respective instruments;
   each said instruction selection circuit selecting an instruction of said received instructions according to a control signal for forwarding to each said instruction execution unit;
   (b) an instruction standby unit whose input side is coupled by an instruction bus to said instruction generation unit and whose output side is coupled by a wait instruction bus to an input terminal of said input terminals of each said instruction selection circuit;
   said instruction standby unit temporarily holding an input instruction, wherein at least one of said input terminals of each said instruction selection circuit being coupled by an instruction bus to said instruction generation unit while the other input terminals thereof are coupled by wait instruction buses to said instruction standby unit; and
   (c) control means capable of:
   detecting each instruction supplied from said instruction selection circuits to said instruction execution units;
   causing said instruction standby unit to store an instruction of instructions from said instruction generation unit that has not been executed by either of said instruction execution units;
   causing said instruction selection circuits to send such an unexecuted instruction to said instruction execution units.

2. A data processor of claim 1 wherein:
   said instruction standby unit decodes different types of instructions, to produce different types of wait instruction decode signals; and
   said different types of wait instruction decode signals from said instruction standby unit are applied as control signals to each said instruction selection circuit.

3. A data processor of claim 2 wherein when a wait instruction signal of said wait instruction decode signals applied to an instruction selection circuit of said instruction selection circuits fits an instruction execution criterion of a corresponding instruction execution unit associated with said instruction selection circuit, said control means causes said instruction selection circuit to select an instruction corresponding to said wait instruction signal, while when no instructions are executed said control means causes each said instruction selection circuit to select the first of instructions of said instruction buses for forwarding to each said instruction execution unit.

4. A data processor of claim 3,
   said control means causing said instruction standby unit to store unexecuted instructions and instruction types thereof;
   said instruction standby unit being capable of sending said stored unexecuted instructions to said wait instruction bus and said instruction types to a wait instruction decode signal line in the order that they are stored.

* * * * *